United States Patent
Kilian et al.

(10) Patent No.: US 8,533,717 B2
(45) Date of Patent: Sep. 10, 2013

(54) FAST PLATFORM INDEPENDENT INTER-PROCESS COMMUNICATION

(75) Inventors: Frank Kilian, Mannheim (DE); Oliver Luik, Baden-Württemberg (DE)

(73) Assignee: SAP AG, Walldorf (DE)

(*) Notice: Subject to any disclaimer, the term of this patent is extended or adjusted under 35 U.S.C. 154(b) by 1633 days.

(21) Appl. No.: 11/013,276

(22) Filed: Dec. 14, 2004

(65) Prior Publication Data

US 2006/0130063 A1 Jun. 15, 2006

(51) Int. Cl.
- *G06F 9/46* (2006.01)
- *G06F 15/167* (2006.01)
- *G06F 3/00* (2006.01)

(52) U.S. Cl.
USPC .......................... 718/100; 719/312; 709/213

(58) Field of Classification Search
USPC ............ 718/1–105; 709/201–203, 212–216, 709/223–226; 719/311–318
See application file for complete search history.

(56) References Cited

U.S. PATENT DOCUMENTS

| | | | |
|---|---|---|---|
| 5,745,778 A | 4/1998 | Alfieri | |
| 5,842,015 A * | 11/1998 | Cunniff et al. | 718/104 |
| 6,170,045 B1 * | 1/2001 | Bobak et al. | 711/169 |
| 6,519,594 B1 * | 2/2003 | Li | 707/10 |
| 6,687,702 B2 * | 2/2004 | Vaitheeswaran et al. | 1/1 |
| 6,738,977 B1 * | 5/2004 | Berry et al. | 719/332 |
| 6,829,769 B2 * | 12/2004 | Cranston et al. | 719/312 |
| 7,246,135 B2 * | 7/2007 | Reid | 1/1 |
| 7,251,815 B2 * | 7/2007 | Donovan et al. | 718/105 |
| 7,293,270 B1 * | 11/2007 | Gupta et al. | 718/102 |
| 7,299,468 B2 * | 11/2007 | Casey et al. | 718/104 |
| 7,302,609 B2 * | 11/2007 | Matena et al. | 714/15 |
| 7,370,335 B1 * | 5/2008 | White et al. | 719/328 |
| 7,464,138 B2 * | 12/2008 | Le et al. | 709/206 |
| 2002/0026446 A1 * | 2/2002 | Groos et al. | 707/102 |
| 2002/0144006 A1 * | 10/2002 | Cranston et al. | 709/312 |
| 2002/0144010 A1 * | 10/2002 | Younis et al. | 709/314 |
| 2003/0037178 A1 * | 2/2003 | Vessey et al. | 709/319 |
| 2003/0088604 A1 * | 5/2003 | Kuck et al. | 709/1 |
| 2003/0191795 A1 | 10/2003 | Bernardin et al. | |
| 2003/0195938 A1 * | 10/2003 | Howard et al. | 709/208 |
| 2004/0078722 A1 * | 4/2004 | Pfeiffer et al. | 714/47 |
| 2004/0080535 A1 * | 4/2004 | Lueckhoff et al. | 345/758 |
| 2005/0005200 A1 * | 1/2005 | Matena et al. | 714/38 |
| 2005/0262181 A1 * | 11/2005 | Schmidt et al. | 709/200 |

FOREIGN PATENT DOCUMENTS

EP 0 459 931 A2 12/1991

OTHER PUBLICATIONS

Web Application Server: Web Application Technology and Web Dynpro; SAP White Pages; SAP 2001; pp. 1-29.*
XI Exchange Infrastructure; SAP XI Tuning; SAP 2002; pp. 1-16.*
Alfons Kemper, Donald Kossmann, Bernhard Zeller; Performance Tuning for SAP R/3; IEEE 1999; pp. 32-39.*

(Continued)

*Primary Examiner* — Abdullah Al Kawsar
(74) *Attorney, Agent, or Firm* — Schwegman Lundberg & Woessner, P.A.

(57) ABSTRACT

A system and method are described for performing data processing using shared memory. In one embodiment, a request to perform a transaction is received at a memory. The memory includes a shared memory to provide a common access to a plurality of components including a plurality of work processes and a plurality of worker nodes. The request is then cached at the memory and later assigned to an available work process for performance.

14 Claims, 15 Drawing Sheets

(56) References Cited

OTHER PUBLICATIONS

"A Complete Guide to OS/2 Interprocess Communications and Device Monitors", *Microsoft Systems Journal*, vol. 4 No. 5, (Sep. 1989), 35-30.

"European Application Serial No. 05027367.1, Office Action mailed Aug. 11, 2009", 6 pgs.

Casavant, T.L. and Kuhl, J.G., "A Taxonomy of Scheduling in General-Purpose Distributed Computing Systems," *IEEE* 14(2):141-154, (1988) XP000039761.

Dandamudi, S.P., "Reducing Run Queue Contention in Shared Mamory Multiprocessors," *IEEE* pp. 82-89 (1997) XP000657329.

Tanenbaum, A.S., *Modern Operating Systems*, 2nd Edition, Upper Saddle River, New Jersey: Prentice-Hall, Inc., pp. 531-578 (2001). English Translation of: *Moderne Betriebssysteme*, vol. 2, pp. 539-617, (2002) XP002385695.

Yue, K.K. and Lilja, D.J., "An Effective Processor Allocation Strategy for Multiprogrammed Shared-Memory Multiprocessors,"*IEEE*8(12):1246-1258, (1997).

European Application No. 05027367.1, European Search Report.

\* cited by examiner

FAST PLATFORM INDEPENDENT INTER-PROCESS COMMUNICATION

BACKGROUND

1. Field of the Invention

This invention relates generally to data processing. More particularly, an embodiment relates to a system and method for performing data processing using shared memory.

2. Description of the Related Art

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the Java 2 Platform, Enterprise Edition™ (J2EE) standard, the Microsoft® .NET™ standard and/or the Advanced Business Application Programming™ (ABAP) standard developed by SAP AG.

For example, in a J2EE environment, such as the one illustrated in FIG. 1C, the business layer 122 is to handle the core business logic of the application having Enterprise Java-Bean™ (EJB or enterprise bean) components with support for EJB containers 134. While the presentation layer 121 is responsible for generating servlets and Java ServerPages™ (JSP or JSP pages) interpretable with support for Web containers 132 by different types of browsers at the client 125 via a web server 136 a network 103 (e.g., Internet or intranet).

In recent years, as business application development projects have grown larger and more diversified, integration of business applications in terms of people, information, and processed is becoming increasingly important. SAP®) NetWeaver™ was developed and presented by SAP AG with core capabilities to provide a solution for the integration of people, information, and processes.

However, the integration of people, information, and process is resulting in an ever increasing demand for high-level planning, maintenance, and administration, which in turn, requires the underline architecture and environment to conform to, for example, platform independence, inter-process communication, increased security, development versioning, multi-user possibility, shared memory, and efficient class-loading. For example, it would be useful to have an architectural environment that provides increased robustness, improved integration, better monitoring, reduced memory footprint, decreased internal threads, faster session failover, and shared memory.

SUMMARY

A system and method are described for performing data processing using shared memory. In one embodiment, a request to perform a transaction is received at a memory. The memory includes a shared memory to provide a common access to a plurality of components including a plurality of work processes and a plurality of worker nodes. The request is then cached at the memory and later assigned to an available work process for performance.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
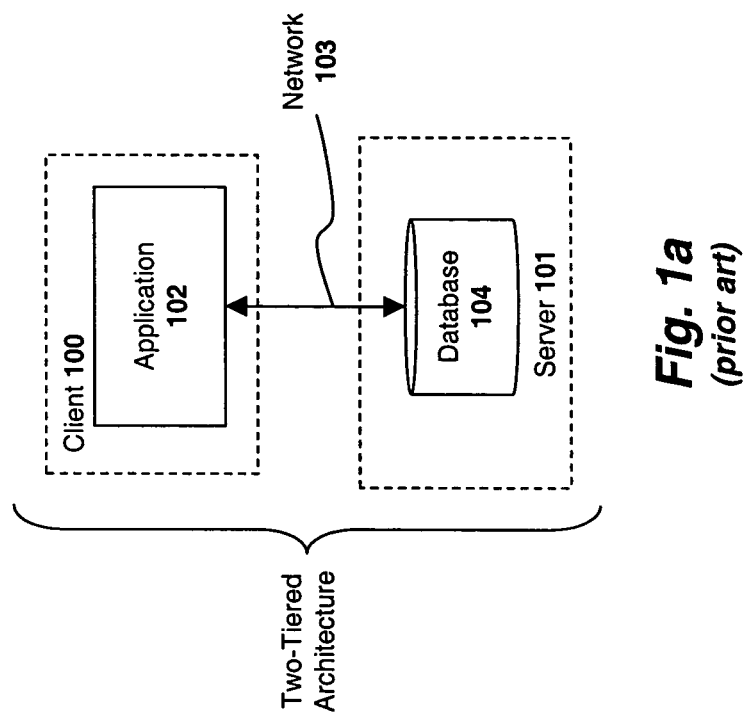
FIG. 1A is a block diagram illustrating a prior art two-tier client-server architecture.
Figure 1B:
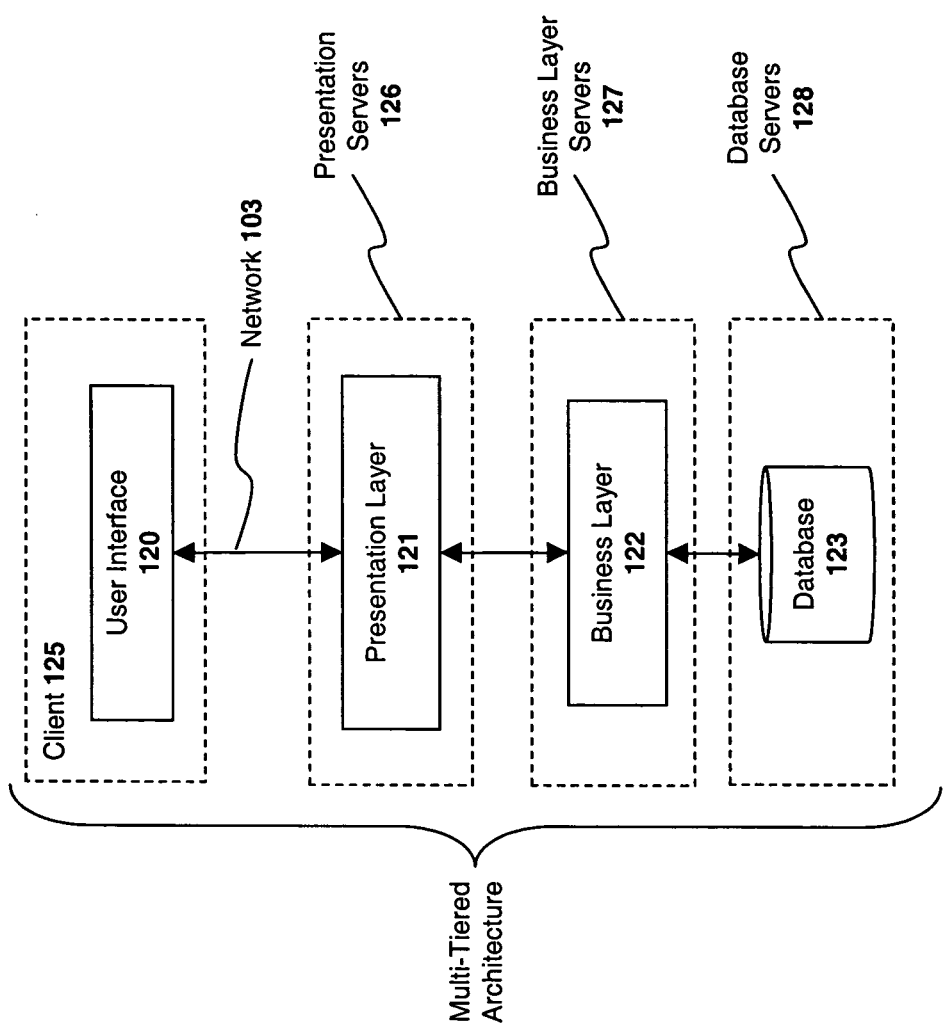
FIG. 1B is a block diagram illustrating a prior art multi-tier client-server architecture.
Figure 1C:
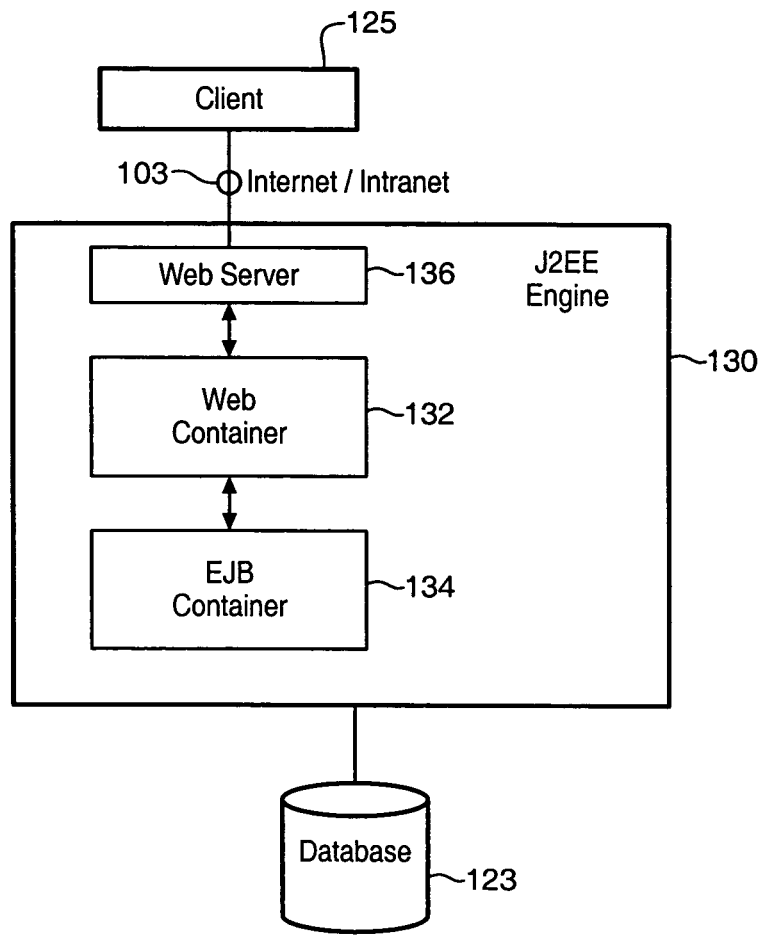
FIG. 1C is a block diagram illustrating a prior art J2EE environment.

Described below is a system and method for employing performing data processing using shared memory. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
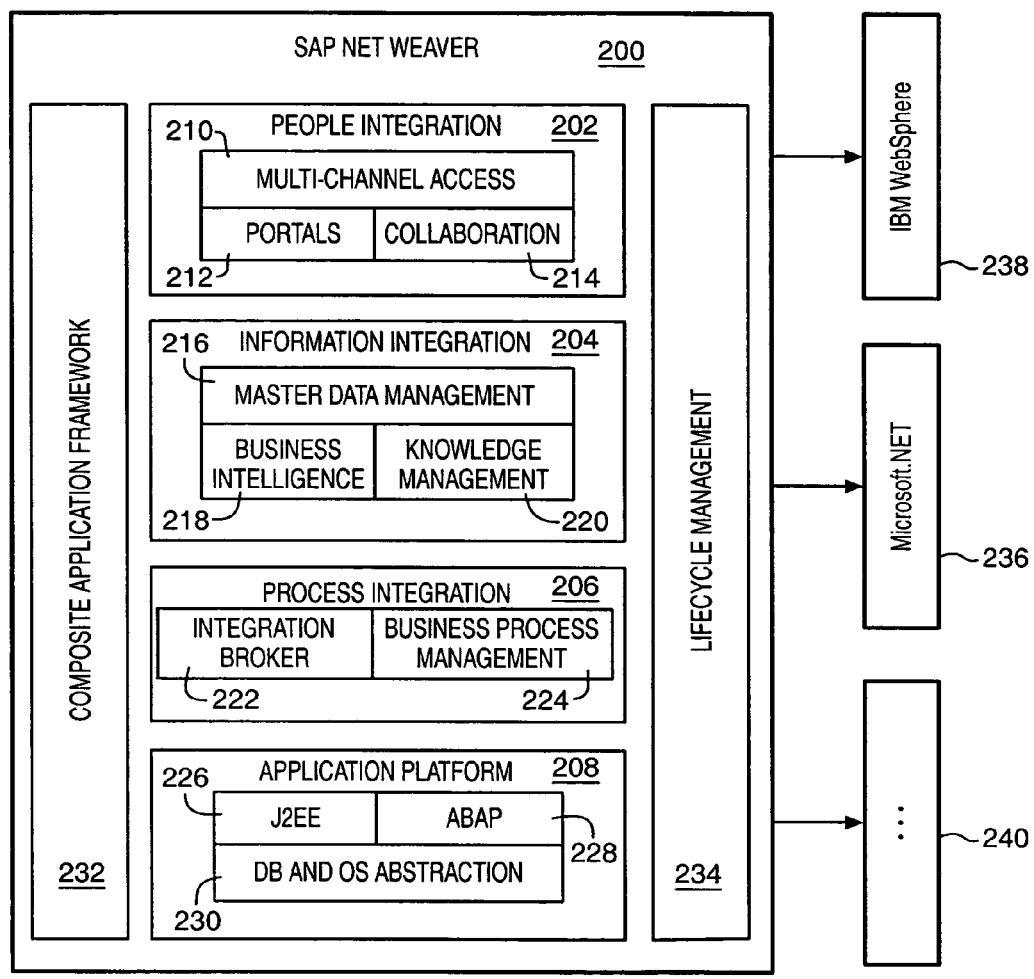
FIG. 2 is a block diagram illustrating an embodiment of the core components of SAP NetWeaver architecture.

FIG. 2 is a block diagram illustrating an embodiment of the core components of SAP NetWeaver architecture 200. As illustrated, the architecture 200 comprises various SAP platforms that are merged together to provide the integration of people, information, and processes in one solution. From an organizational point of view, the architecture 200 includes the following four core areas: people integration 202, information integration 204, process integration 206, and application platform 208. People integration 202 is performed using a portal solution 212 and a platform to work in collaboration 214. Users are provided a multi-channel access 210 to ensure mobility. Examples of the portal solution 212 include SAP Enterprise Portal, SAP Mobile Engine, and Collaboration Package for SAP Enterprise Portal.

Information integration 204 refers to converting information into knowledge quickly and efficiently. Information integration 204 provides efficient business intelligence 216 and knowledge management 220 using SAP products like Business Information Warehouse (BW) and Knowledge Management (KM). Further, consolidation of master data management 218 beyond system boundaries is performed using SAP's Master Data Management (MDM). Process integration 206 refers to optimized process management using integration broker or SAP exchange infrastructure 222 and business process management 224 techniques. Examples of products to perform process integration 206 include Exchange Infrastructure (XI) and Business Process Management (BPM).

Application platform 208 refers to SAP's Web Application Server (Web AS), which is the basis for SAP applications. Web AS, which may be independent of the database and operating system 230, includes a J2EE engine 226 in combination with an already present ABAP engine or instance 228 to further enhance the application platform 208. The architecture 200 further includes a composite application framework 232 to provide various open interfaces (APIs) and a lifecycle management 234, which is an extension of the previous Transport Management System (TMS). As illustrated, the architecture 200 further provides communication with Microsoft NET 236, International Business Machine® (IBM) WebSphere™ 238, and the like 240.

Figure 3:
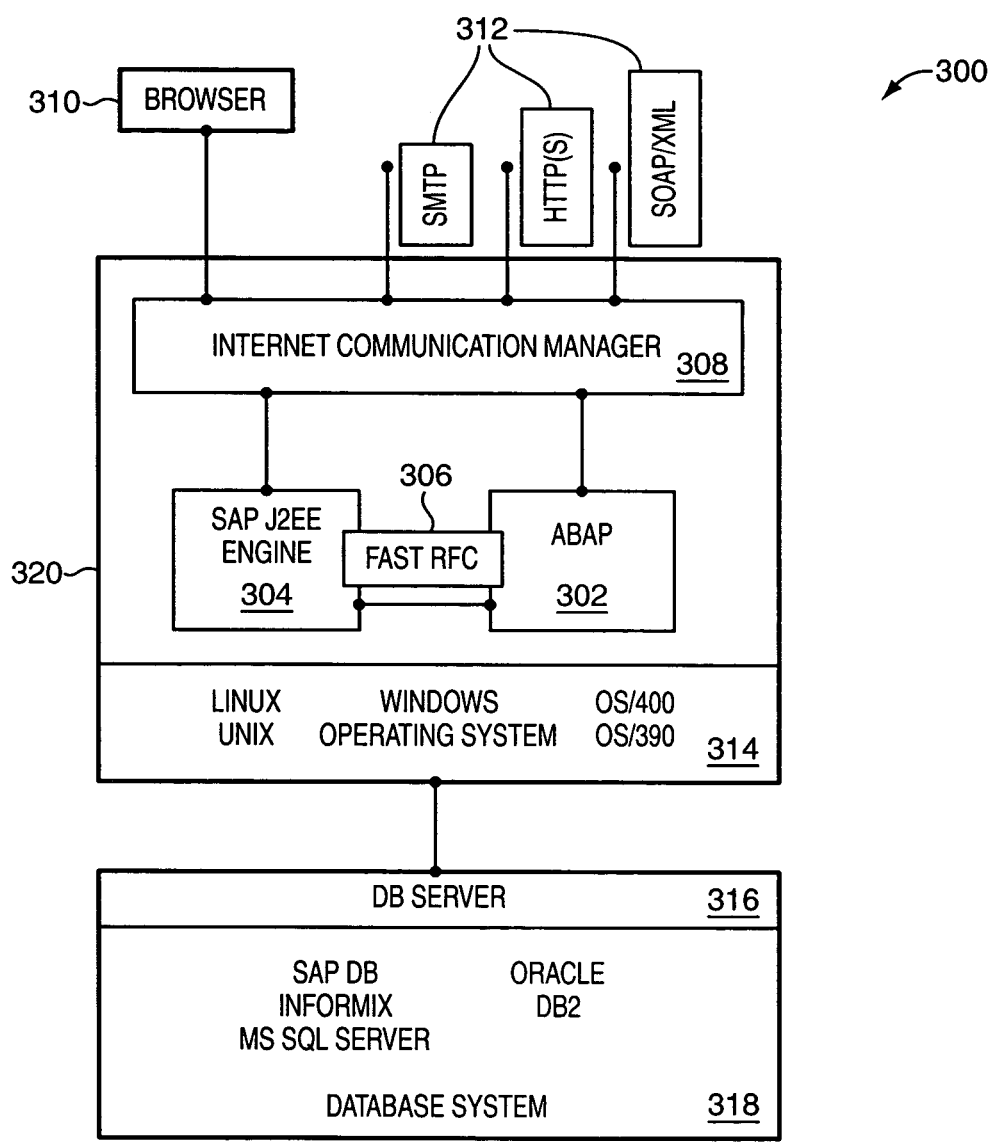
FIG. 3 is a block diagram illustrating an embodiment of an architecture having a Web Application Server.

FIG. 3 is a block diagram illustrating an embodiment of an architecture 300 having a Web Application Server 320. The architecture 300 serves as an application platform (e.g., application platform 208 of FIG. 2) for SAP NetWeaver and other SAP products. As illustrated, the architecture 300 includes a Web AS 320 having an ABAP engine 302, which provides the ABAP development and runtime environment, with the dependability, scalability, and inter-process independence of operating systems 314 and database systems 318. The operating system 314 includes LINUX, UNIX, Windows, OS/390, OS/400, and the like. The database system 318 is based on a database server 316, such as SAP database (SAP DB), Informix, Oracle, DB2, Microsoft Sequential Query Language (MS SQL) server, and the like.

The Web AS 320 having the ABAP engine 302 is further enhanced by including a J2EE engine 304. The J2EE engine 304 is in communication with the ABAP engine 302 via a fast Remote Function Call (RFC) connection 306. The two engines 302-304 are further in communication with an Internet Communication Manger (ICM) 308. The ICM 308 is provided for handling and distributing queries (e.g., Internet queries) to various individual components of the architecture 300. The architecture 300 further supports a browser 310, such as Microsoft Internet Explorer, Netscape Navigator, and other modified variations of mobile end devices, such as personal digital assistants (PDAs), pocket computers, smart cell phones, other hybrid devices, and the like. The Web AS 320 also supports various protocols and standards 312, such as HyperText Markup Language (HTML), eXtensible Markup Language (XML), Wireless Markup Language (WML), HyperText Transport Protocol (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like.

Figure 4:
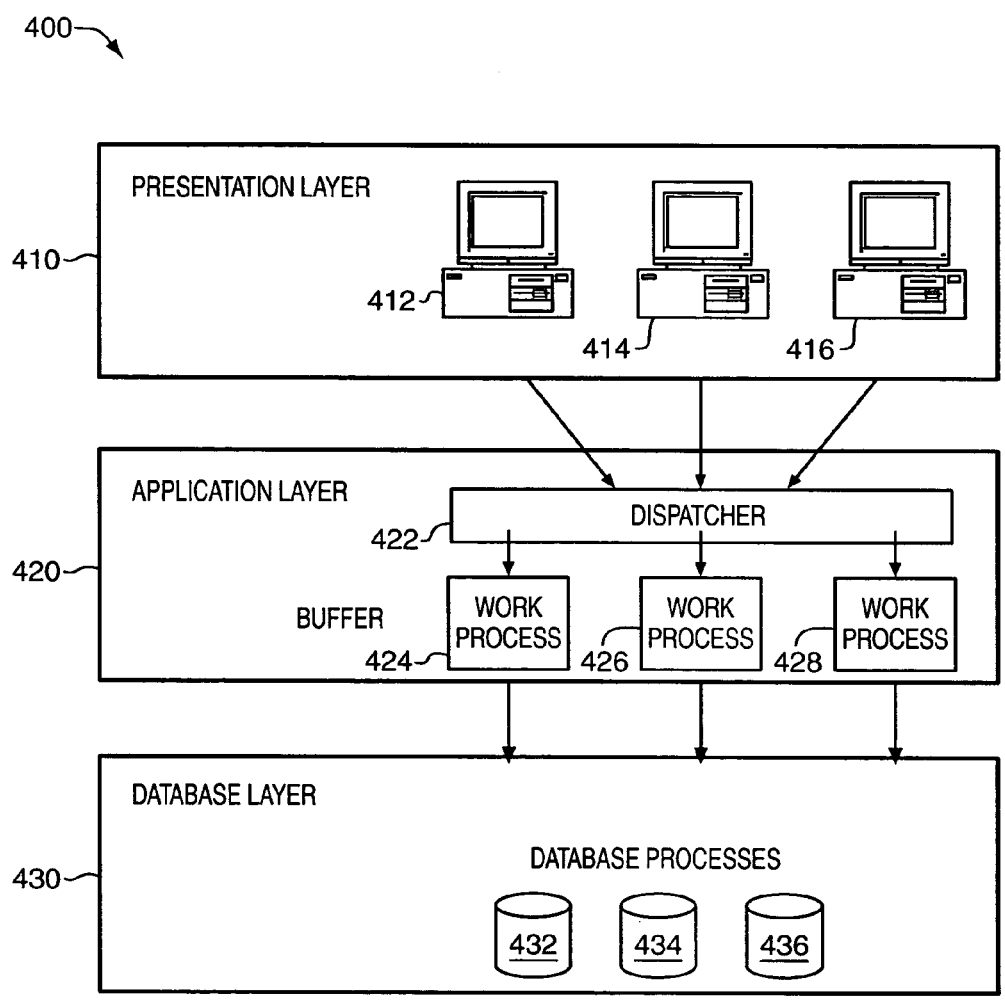
FIG. 4 is a block diagram illustrating an embodiment of a Web Application Server-based architecture having multiple layers.

FIG. 4 is a block diagram illustrating an embodiment of a Web Application Server-based architecture 400 having multiple layers 410, 420, 430. As illustrated, the three layers or levels 410, 420, 430 include a presentation layer (or distributed services or manager or user or client layer) 410, an application agent layer (or agent layer) 420, and a database layer (or instrumentation layer) 430. Various components and elements at each of layer 410, 420, 430 of the architecture 400 are, directly or indirectly, interconnected via a network (e.g., a Local Area Network (LAN)). Alternative embodiments of the architecture 400 may include more or fewer layers.

At the presentation layer 410, the clients are illustrated as workstations or terminals 412-416 that are used to collect and gather user input and send it to the application layer 420 via a network connection. The network connection may be a wired or wireless connection to a LAN, a Wide Area Network (WAN), a Metropolitan Area Network (MAN), an intranet, and/or the Internet. The terminals 412-416 include personal computers, notebook computers, personal digital assistants, telephones, and the like. In one embodiment in which the network connection connects to the Internet, one or more of the user terminals 412-416 may include a Web browser (e.g., Internet Explorer or Netscape Navigator) to interface with the Internet.

The presentation layer 410 allows the end user to interact with the relevant application using a GUI, such as the SAP GUI, which is a universal client widely used for accessing SAP R/3 or mySAP functions. The GUI works as a browser and offers easy access to various SAP functions, such as application transactions, reports, and system administration functions. The SAP GUI, for example, is available in three different formats, each of which having its own unique selling point and is suited to a particular user. The three formats include SAP GUI for Windows®, SAP GUI for HTML, and SAP GUI for Java™.

The presentation layer 410 may also includes various management applications, such as a Java Management Extension (JMX)-compliant management application, a JMX manager, and/or a proprietary management application. The management applications include one or more graphical management applications, such as a visual administrator, operating to, for example, retrieve and display information received from the application layer 420 and/or the database layer 430. The visual administrator includes a monitor viewer to display such and other information. The monitor viewer includes a GUI-based or Web-based monitor viewer. Management applications include third party tools, such as file systems, to store information.

The application layer 420 includes various application servers and computing devices to perform data processing. The application layer 420 includes a dispatcher 422, which refers to the central process on the application layer 420 for processing transactions. For example, the dispatcher 422 is used to distribute the request load to individual work processes 424-428, organize communication between the work processes 424-428, and handle connection to the presentation layer 410. For example, when a user makes processing entries from his computer using the menu on the presentation layer 410, the entries are converted into a special format (e.g., GUI protocol) and forwarded to the dispatcher 422. The dispatcher 422 then places this request in a dispatcher queue. The queue is then used to find free work processes 424-428 that carry out the processing. The application layer 420 may be implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. The management techniques described herein are used to manage resources within a "cluster" of server nodes. An exemplary cluster architecture is described below with respect to FIGS. 11-12. However, the underlying principles of the invention are not limited to any particular application server architecture.

The database layer 430 is used to optimize the data access without being dependent on the underlying database and the operating system. The database independence is achieved using open standards, such as Open SQL and Java Database Connectivity (JDC). The presentation layer 410 is where the user interacts with the relevant application, which is then executed at the application layer 420, while the data persistence 432-436 is managed at the database layer 430. The database layer 430 may include one or more database management systems (DBMS) and data sources. Furthermore, the database layer 430 is compatible with both the ABAP and J2EE environments.

The database layer 430 may include one or more database servers, EJB servers, old systems, and my SAP components. The clients at the presentation layer 410 may access one or more of the applications via standalone Java programs and programs that help access an application via, for example, using Internet Inter-Object Request Broker Protocol (IIOP)/Common Object Request Broker Architecture (COBRA) written using any number of programming languages (e.g., –C, C, and C++).

The J2EE environment may also include various J2EE containers that are associated with various J2EE services and APIs, which include Java Naming Directory Interface (JNDI), Java Database Connectivity (JDBC), J2EE connector Architecture (JCA), Remote Invocation (RMI), Java Transaction API (JTA), Java Transaction Service (JTS), Java Message Service (JMS), Java Mail, Java Cryptography Architecture (JCA), Java Cryptography Extension (JCE), and Java Authentication and Authorization Service (JAAS). The J2EE services further include EJB_service, servlet_JSP, application client_service, connector_service to provide (J2EE containers, namely) EJB containers, Web containers, application client containers, and connector containers, respectively.

Figure 5:
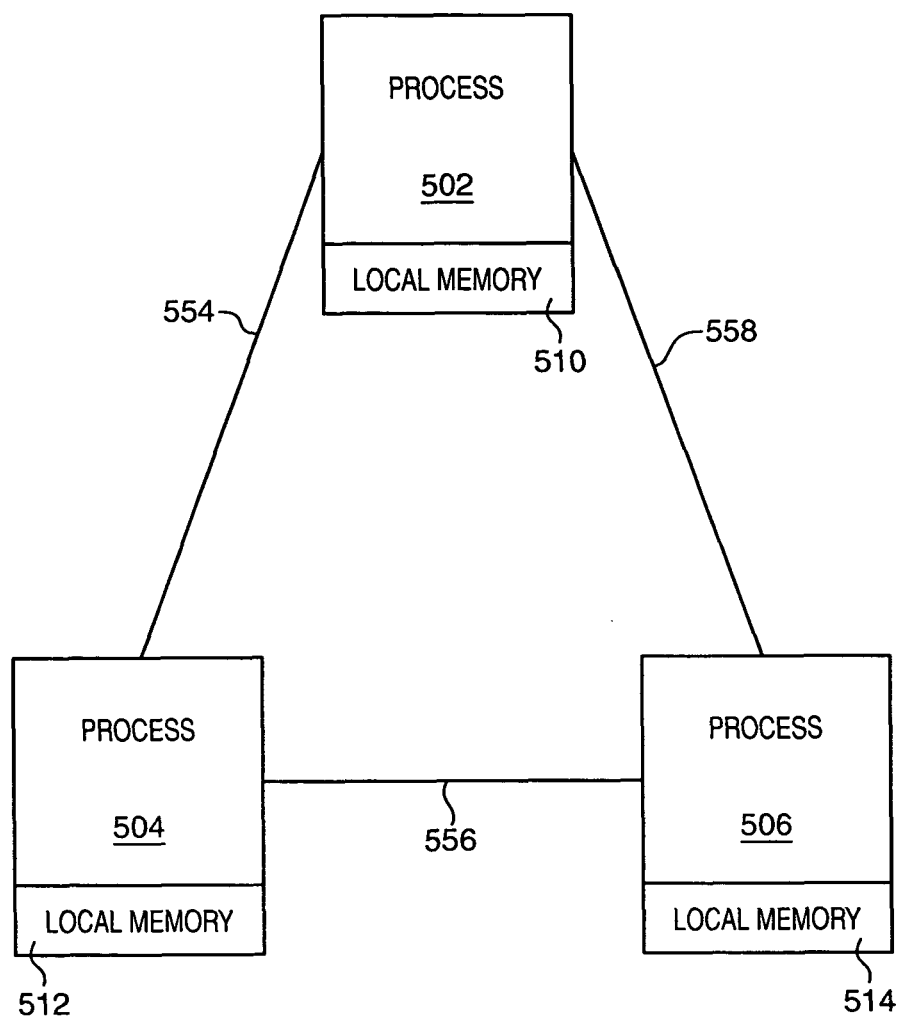
FIG. 5 is a block diagram illustrating a network-based communication architecture for performing data processing using processes.

FIG. 5 is a block diagrams illustrating a network-based communication architecture 500 for performing data processing using processes 502-506. Computers typically communicate with each other via one or more networks without the advantage of having common shared memory. In the illustrated network-based communication architecture 500, a local memory 512-514 is assigned to and corresponds with each of the processes 502-506 for access to facilitate data processing. Furthermore, socket (not shown) are provided as interfaces that serve as a communication mechanism to act as endpoints for sending and receiving data between various processes 502-506.

A process 502-506 refers to a task being run by a computer, which is often executed simultaneously with several other tasks. Many of the processes 502-506 exist simultaneously with each of them taking turns on the central processing unit (CPU). Typically, the processes 502-506 include operating system (OS) processes that are embedded in the operating system. The processes 502-506 consume CPU time as opposed to the memory 510-514 that takes up space. This is typically the case for both the processes that are managed by the operating system and those processes that are defined by process calculi. The processes 502-506 further include specialized processes, such as ABAP work processes and J2EE worker nodes.

The operating system works to keep the processes 502-506 separated and allocate the resources to help eliminate the potential interferences of the processes 502-506 with each other when being executed simultaneously. Such potential interferences can cause system failures. Further, the operating system may also provide mechanisms for inter-process communication to enable processes to interact in safe and predictable manner. Typically, an OS process 502-506 consists of memory (e.g., a region of virtual memory), which contains executable code or task-specific data, operating system resources that are allocated to each of the processes which include file descriptor (for UNIX) and handles (for Windows), security attributes (e.g., process owner and the set of permissions), and the processor state (e.g., content of registers, physical memory addresses), which is stored in the actual registers when the process is executing.

The ABAP work processes and the J2EE worker nodes which are OS processes 502-506 are considered specialized processes that contain the attributes and behavior of the typical OS process and are created, scheduled, and maintained by the operating system. For example, the ABAP work processes are specialized in that they are used to execute the ABAP-based transactions, and the J2EE worker nodes are specialized in that they are used to execute the Java-based transactions.

Having assigned individualized memory 510-514 to each of the processes 502-506 provides a relatively inefficient computing, which lacks robustness as the processes 502-506 do not communicate with each other and have to access the local memory 510-514 for information or data. Furthermore, such network-based communication using various network connections 554-558 also causes the data processing transactions to be time-consuming, unreliable due to network errors, and less secure. For example, a typical data processing transaction may include retrieving of the data from one local memory 510-514, flowing of the data through various protocols (e.g., Transmission Control Protocol (TCP), User Datagram Protocol (UDP)), addresses (e.g., Internet Protocol (IP) address) and operating systems, before reaching its destination at another local memory 510-514.

Figure 6:
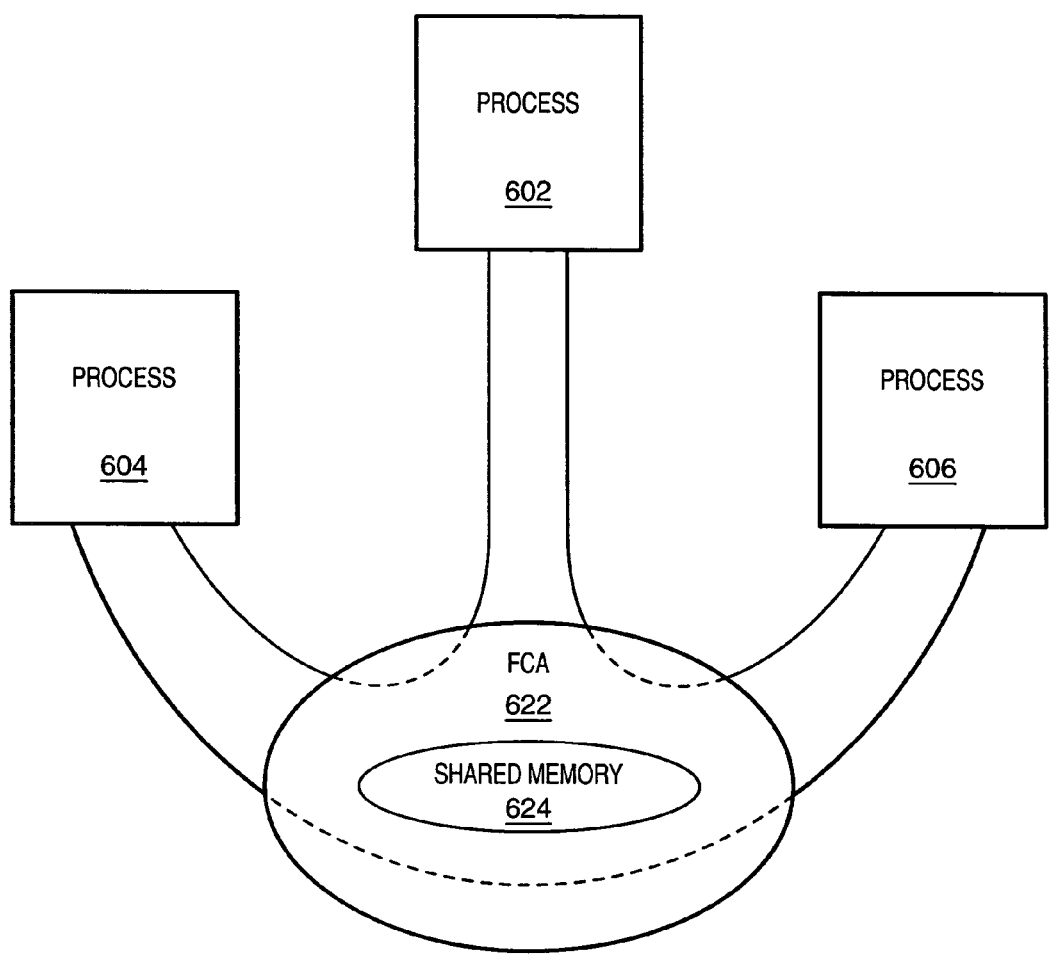
FIG. 6 is a block diagram illustrating an embodiment of a Web Application Server architecture having a Fast Channel Architecture including shared memory.

FIG. 6 is a block diagram illustrating an embodiment of a Web Application Server architecture 600 having a Fast Channel Architecture (FCA) 622 including shared memory 624. In one embodiment, the FCA 622 includes shared memory 624 to facilitate bi-directional communication between independent processes 602-606. The processes 602-606 include OS processes including ABAP work processes and J2EE worker nodes as described with references to FIG. 5. The shared memory 624 at the FCA 600 provides a relatively fast, efficient, scalable, reliable, and secure communication between various processes 602-606 on the same physical host. The shared memory-based bi-directional communication utilizes the centralized shared memory 624 for the processes 602-606 to share and access and thus, eliminating the need for having an individualized local memory and for communicating via a network. Furthermore, the use of the shared memory 624 provides for a copy-free communication, high bandwidth, low latency, and fixed size communication buffers.

The processes 602-606 refer to tasks embedded in the operating system. For example, each time a client initiates a program or a document (e.g., opening Microsoft Word®), a request is placed with the operating system regarding commencing the task of opening the document for the client. Several of such processes 602-606 can be performed simultaneously in the CPU by taking turns. Typically, an operating system provides the isolation of such processes 602-606, so they are less likely to interfere with each other, such as when there is a crashed process, such as process 602, none of the other processes, such as processes 604-606, are affected by it and so the potential system failure is avoided. For example, the operating system can increase isolation and robustness by allocating one process 602-606 for each user session, and running a VM for that user session within the allocated process 602-606. However, in some situations (e.g., when there are a large number of user sessions), such operating system scheduling and allocation can add to the system overhead and consume valuable resources, such as time and space.

The processes 602-606 may contain some memory (e.g., a region of virtual memory for suspended processes which contains executable code or task-specific data), operating system resources that are allocated to such processes 602-606 (such as file descriptors, when referring to UNIX, and handles, when referring to Windows), security attributes, such as process owner and the process' set of permissions, and the processor state, such as the content of registers, physical memory addresses, etc.

Various enterprise servers and other large servers are considered request processing engines for processing large numbers of small user requests associated with user sessions. The user requests lead to the creation of processes 602-606, which refer to processing of such user requests. The processing of the requests usually involves the running of a business code (e.g., Java servlets or EJBs) in a runtime system (e.g., a Java virtual machine (JVM)) executing on a server. In such a server, scalability can be achieved by using multiple threads, such as a multi-threaded VM, to process requests corresponding to a number of user sessions.

In one embodiment, the shared memory 624 can provide a common access and a buffer for the process-attachable VMs, the OS processes 602-606 including ABAP work processes and J2EE worker nodes, as well as dispatcher processes. It is to be noted that the ABAP work processes at the ABAP engine are considered specialized processes that are used for processing the OS processes 602-606 with specialized functionality. The work processes have the attributes and behavior that are also common with the OS processes 602-606 and they may be created, scheduled, and maintained by the operating system. For example, the ABAP work processes are to execute ABAP transactions, while the J2EE worker nodes, also regarded as specialized processes having similar attributes as the processes 602-606, are to execute the Java code.

Having introduced the FCA 622 to the architecture 600 facilitates an executable program (e.g., a program running on an OS process 602-606 executing the code) to use the FCA functionalities by binding the FCA library at the time of development and by calling the FCA-API in the programming language (e.g., C or Java). For example, at runtime, the executable program operates as a process 602-606 in the operating system, such as when a program (e.g., MS Word or Excel) is started several times, which creates several OS processes 602-606 associated with one program that are performed using the FCA functionalities. In one embodiment, the FCA 622 may remain independent of a particular programming language (e.g., ABAP or Java) or a particular operating system (e.g., UNIX or Windows). The FCA functionalities (e.g., ABAP statements, transactions, input/output processing, etc.) may be achieved by coding such functionalities in the program. Stated differently, the program, when running, is executed as an OS process 602-606 and as such it performs various tasks, such as reading/writing data, processing data, and accessing the FCA functionalities.

Although not illustrated here, a dispatcher (e.g., ABAP dispatcher) could serve as a central process on the application layer for processing transactions. For example, the ABAP dispatcher facilitates the starting of the ABAP work processes, monitoring of the status of the work processes, restarting a work process in case of a crash, communicating with the GUI, dispatching requests to the ABAP work processes based on the availability of such work processes, and communicating with the message server. In one embodiment, the dispatcher may use the FCA-based shared memory 624 to communicate with the work processes, but the FCA 622 alone may not necessarily replace the dispatcher. However, the functionalities of the dispatcher may be moved to other components and processes, such as to the Internet Communication Manger (ICM) (not shown) to perform one or more of the dispatcher-related tasks. In one embodiment, this can be performed by providing a code in the program, which when running on an OS process 602-606, can execute the code. Also, on the ABAP side, the dispatcher may still remain to provide communication with the GUI.

On the J2EE side, in one embodiment, the functionality of the J2EE dispatcher (not shown) may be moved to the ICM. The moving of the J2EE dispatcher functionalities to the ICM provides increased robustness, scalability, and a simple architecture with a single access point. In another embodiment, it is not required that the J2EE dispatcher be removed when using the FCA-based architecture 600 and that the FCA 622 can also work with the J2EE dispatcher to perform various tasks. In an alternative embodiment, with regard to dispatching various requests, neither the ABAP dispatcher nor the J2EE dispatcher may be needed, because the user requests can be serially assigned to the available ABAP work processes and J2EE worker nodes. For example, each ABAP work process could maintain a request queue for various requests at the shared memory 624 and attach the VM of the user session corresponding to the request at the front of the request queue to process the next request.

In one embodiment, having the shared memory 624 helps eliminate the necessity for local communication memory or individually dispersed memory for performing processes 602-606 and for communicating data. Stated differently, the shared memory 624, as opposed to a local memory using a network connection, is used to create a buffer (e.g., for receiving and transmitting data) for various processes 602-606. For example, once a request to perform a particular task is received at the server from a client/user session, a process 602-606 to be performed is initiated as the request is created. A request queue is created at the shared memory 624 and the recently-created request is then placed in the request queue. In one embodiment, the dispatcher then determines the availability of various work processes and, based on such availability, assigns the request to the available work process to handle. The work process performs the corresponding process 602-606 to satisfy the client request. The satisfying of the request may include performing the requested task and providing the requested information or response data back to the client via the shared memory 624. In another embodiment, if the dispatcher is not used, the ICM may possess the functionalities of the dispatcher and assign the request to, for example, the available ABAP work process or J2EE worker node. The ABAP-related requests are sent to the ABAP work processes and the Java-related requests are sent to the J2EE worker nodes. Having the shared memory 624 provided by the FCA 622 not only allows a copy-free transmission of the data, but also eliminates the potential of the data being lost due to connection or network failures. Furthermore, using a single shared memory 624 allows the various tasks (e.g., OS processes 602-606) to run on a single local host, which in turn, provides a secure transmission of data. In one embodiment, the shared memory 624 includes memory pipes that are used bi-directionally and are created at startup along with initialization of the FCA 622.

In one embodiment, a block of the shared memory 624 may be set aside to generate request queues with each request queue having one or more requests to be performed. In one embodiment, the work processes and worker nodes may have direct access to this block of the shared memory or portion of the block may be mapped to the address space of the selected work processes and worker nodes.

In one embodiment, the architecture 600 employs FCA handles (not shown) as communication end-points. The handles are regarded as an entity at the FCA 622 level for providing communication. Although the handles are not sockets, they act socket-like. Having the shared memory 624 reduces administrative costs, while increasing consistency and easing communication between various processes 602-606. Various entities at the shared memory 624 may include data, datagrams, application update information, strings, constants, variable, objects that are instances for a class, runtime representations of a class, and classloaders that are used to load class runtime representatives.

Figure 7:
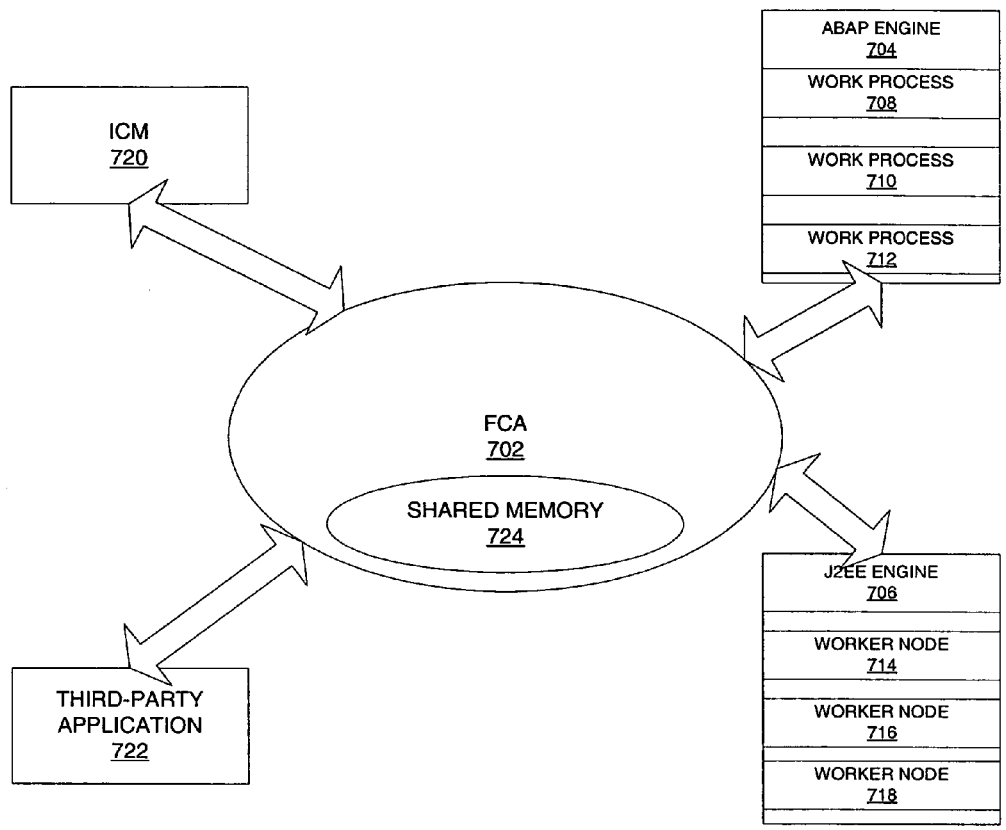
FIG. 7 is a block diagram illustrating an embodiment of a Web Server Application architecture including a Fast Channel Architecture having a shared memory.

FIG. 7 is a block diagram illustrating an embodiment of a Web Server Application architecture (architecture) 700 including a Fast Channel Architecture 702 having a shared memory 724. In the illustrated embodiment, the FCA 702 provides an FCA-based shared memory 724 in communication with an ICM 720, a third-party application 722, an ABAP engine or instance 704, and a J2EE engine or instance 706. The ABAP instance 704 includes various specialized work processes 708-712 that are, based on their availability, assigned various ABAP-based OS processes/client requests to perform. The architecture 700 further includes the J2EE instance 706, which includes server nodes or worker nodes 714-718 to complement the ABAP work processes to perform various Java-based tasks (e.g., performing client requests/OS processes) that are assigned to them. In one embodiment, the J2EE instance 706 may include Java Virtual Machines (JVMs), while the ABAP instance 704 may include ABAP language VMs (ABAP VMs). The ABAP is a programming language for developing applications for the SAP R/3 system, which is a widely installed business application system developed by SAP AG. The Common Language Runtime (CLR) VMs may communicate with ABAP instance using FCA. The CLR is a managed code execution environment developed by Microsoft Corp. of Redmond, Wash.

The shared memory 724 includes memory pipes, which are used bi-directionally, to provide bi-directional communication between various components of the architecture 700 that include the ABAP instance 704 and the J2EE instance 706 and their work processes 708-712 and worker nodes 714-718, respectively, the ICM 720, and other third-party applications 722. In one embodiment, having the shared memory 724 eliminates the necessity for the J2EE instance 706 to communicate with the ICM 702, and ultimately the client, via the TCP/IP connection. Instead, the J2EE instance 706 and the ABAP instance 704 are integrated such that both instances 704-706 are in communication with the ICM 720 via the shared memory 724. Further, the J2EE instance 706 is no longer required to have a dispatcher to dispatch client requests to various J2EE-based worker nodes 714-718. In one embodiment, the dispatcher-related tasks may be performed at the ICM 720 and, in another embodiment, the dispatcher may still be maintained and used in communication with the J2EE instance 706.

In one embodiment, the FCA 702 is used to provide an integration point for the ABAP and J2EE instances 704-706, which allows the J2EE worker nodes 714-718 and the ABAP work processes 708-712 to have access to the same centralized shared memory 724. Stated differently, not only the ABAP instance 704 and its work processes 708-712 having access to the FCA-based shared memory 724, but also the J2EE instance 706 and its worker nodes 714-718 have access to the same shared memory 724, which allows for direct bi-directional communication between various components of the architecture 700, including the work processes 708-712 and the worker nodes 714-718. Having access to the common shared memory 724 eliminates the need for associating individualized local communication memory for each of the work processes 708-712 and worker nodes 714-718 and the need for distributing the memory to various components of the architecture 700. Furthermore, the FCA-based shared memory 724 provides a common or centralized memory for each of the components to access, which eliminates the need for individualized/localized cache use for communicating entities (e.g., placing requests, updating data, retrieving responses) between components.

In one embodiment, the FCA 702 is used to provide a common API to facilitate the common access to the shared memory 724 and to provide direct bi-directional communication between various components of the architecture 700. In one embodiment, the shared memory 724 includes memory pipes that are used in a bi-directional fashion to facilitate the bi-directional communication between, for example, the ICM 720 and the ABAP and J2EE instances 704-706. The use of the shared memory 724 results in a cost-effective, efficient, fast, robust, and copy-free communication of entities between various components of the architecture 700.

In one embodiment, the ICM 720 is used to facilitate communication between the architecture 700 and the outside world by providing a browser or browser-like access to the user. The Internet protocols supported by the ICM 720 are provided as plug-ins for other standard protocols (e.g., HTTP, SMTP). For example, in a server role, the ICM 720 processes requests from the Internet that are received from the client via a Uniform Resource Locator (URL) with the server/port combination that the ICM 720 listens. The ICM 720 then invokes the local handler responsible for processing these requests, based on the URL. Applications (e.g., Business Server Page (BSP)) needing an ABAP context are transferred to the ABAP work processes 708-712, while Java requests are transferred to the J2EE instance 706 to be processed by the J2EE worker nodes 714-718. In one embodiment, the transfer of the requests between the ICM 720 and the ABAP instance 704 is conducted via a dispatcher, which also serves as a load balancer and a point for providing connection to a GUI, such as the SAP GUI. On the J2EE side, the dispatcher may not be present.

The ICM 720 may include a central request queue for requests that are processed on worker threads. Various time-consuming operations (e.g., accept, SSL handshake, read, write, handshake, and close) are triggered through a request in the ICM request queue, which may not be protocol-specific. The queues in the shared memory 724 include request queues for each of the work processes 708-712 and worker nodes 714-718. The number of entries in the request queues at the shared memory 724 provides an indication of the load situation of the server. The queues in shared memory 724 may also include other relevant information, such as information to help with FCA Queue Monitoring (FQM). The values may include the name of the queue (set at startup), current number of requests in the queue (set by a dedicated process), peak number of requests (maintained by FCA), maximum number of requests (fixed value that can be set at startup), last insert (maintained by FCA), and last remove (maintained by FCA).

Figure 8:
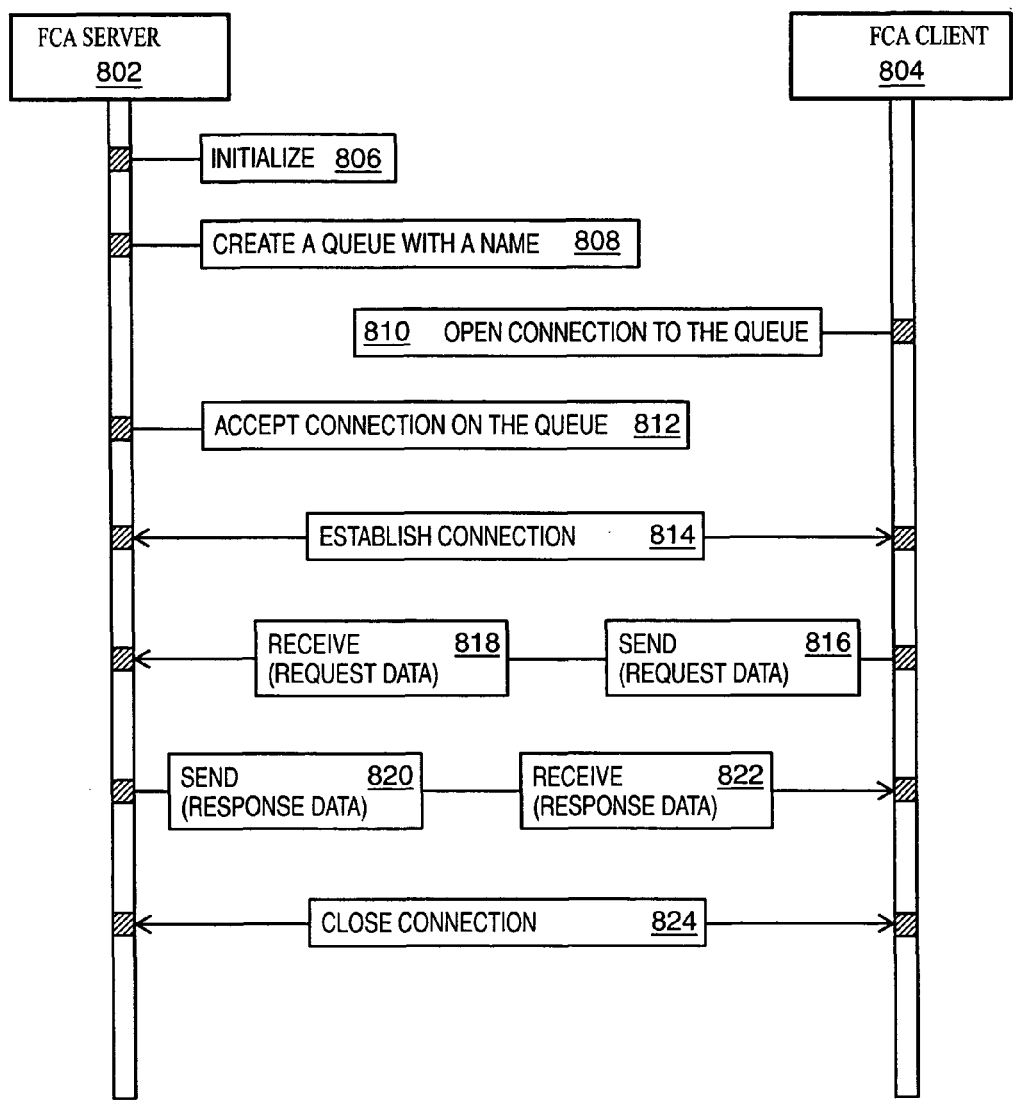
FIG. 8 is a diagram illustrating an embodiment of a transactional sequence between a client and a server using a Fast Channel Architecture-based shared memory.

FIG. 8 is a diagram illustrating an embodiment of a transactional sequence between a client 804 and a server 802 using a Fast Channel Architecture-based shared memory. The client 804 includes an FCA client, while the server 802 includes an FCA server. First, the FCA library is initialized 806 at the server 802. The initialization 806 is performed once at startup. Then, the server-side request queue is created 808. The request queue may be created 808 with a name specified by a parameter name. On the client-side, a new connection object is created 810 for the specified protocol, which is identified by the FCA protocol. The server 802 waits for the incoming connection from the client 804 and once the connection is opened 810 at the client, the server 802 accepts the open connection at the queue 812. In one embodiment, the FCA queue connection is accepted 812 by the server 802 by returning an FCA connection handle to the client 804. With that, the request queue is successfully opened and the connection between the client 804 and the server 802 is established 814 using the FCA-based shared memory.

In one embodiment, once the connection is established 814, the FCA client 804 sends 816 a request to the server 802. The server 802 receives the request having request data 818 from the client 804. The request is then processed at the server 802 using various entities and the server 802 then sends the response data 820 in response to the request from the client 804 to the client 804. The client 804 receives the response data 822. The FCA connection is then closed 824 when it is not longer needed.

Figure 9:
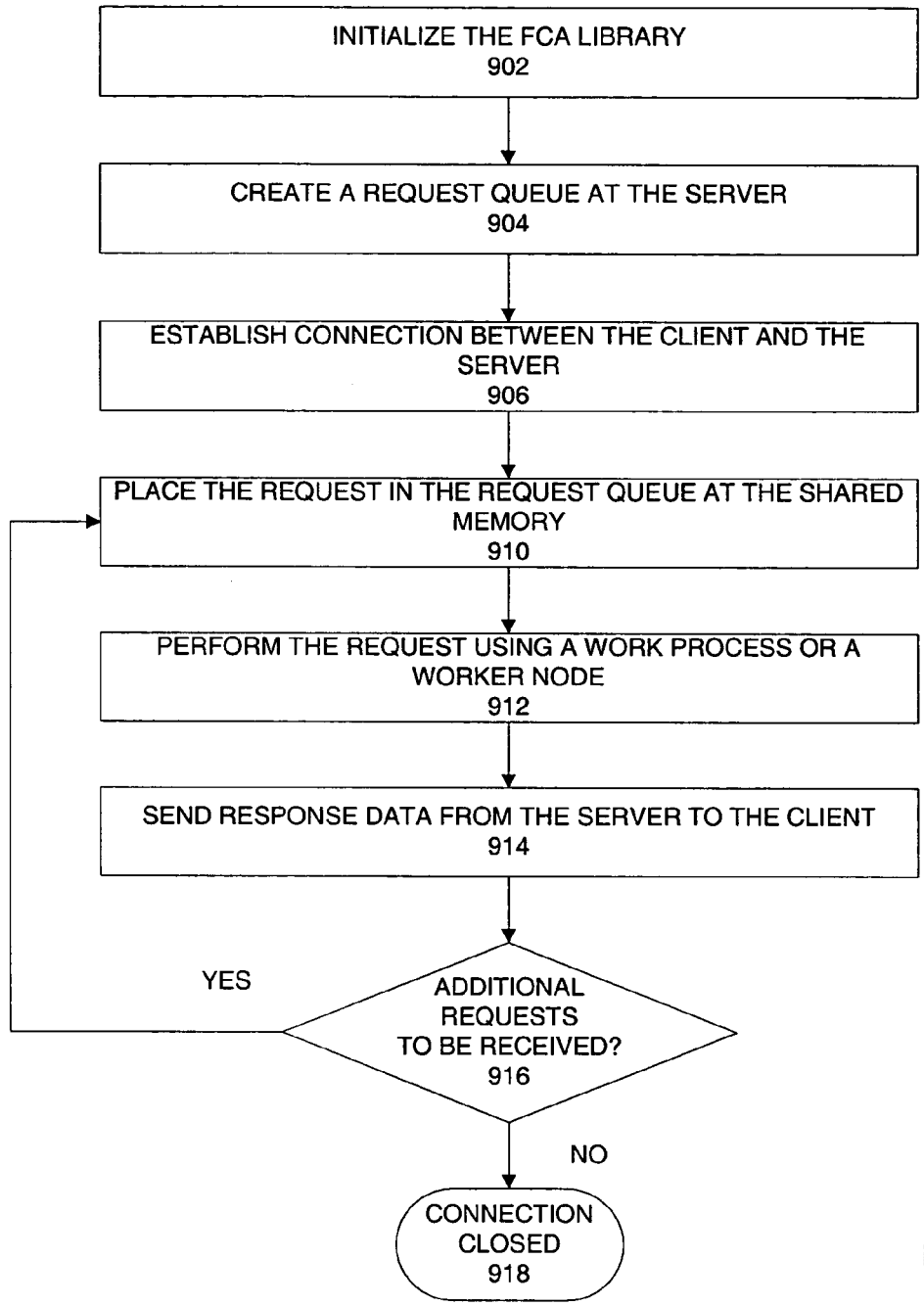
FIG. 9 is a flow diagram illustrating an embodiment of a process for using a Fast Channel Architecture-based shared memory for data processing.

FIG. 9 is a flow diagram illustrating an embodiment of a process for using a Fast Channel Architecture-based shared memory for data processing. First, the FCA library is initialized at processing block 902. A request queue is then created at the server (e.g., FCA server) at processing block 904. The FCA-based shared memory is used in that the request queue on the server is created at the shared memory. It is contemplated that several request queues may be created at the shared memory. The open connection from the client is accepted to establish the connection between the server and the client (e.g., FCA client) using the FCA-based shared memory at processing block 906. The request is placed in the request queue by the client at the shared memory at processing block 910. The request is then processed at the server using one or more entities and response data is determined in response to the request at processing block 912. In response to the request, the response data is sent to the client from the server using the shared memory at the FCA at processing block 914.

At decision block 916, a determination is made as to whether more requests are to be received. If yes, the process continues with processing block 910. If not, the connection is closed at termination block 918.

Figure 10:
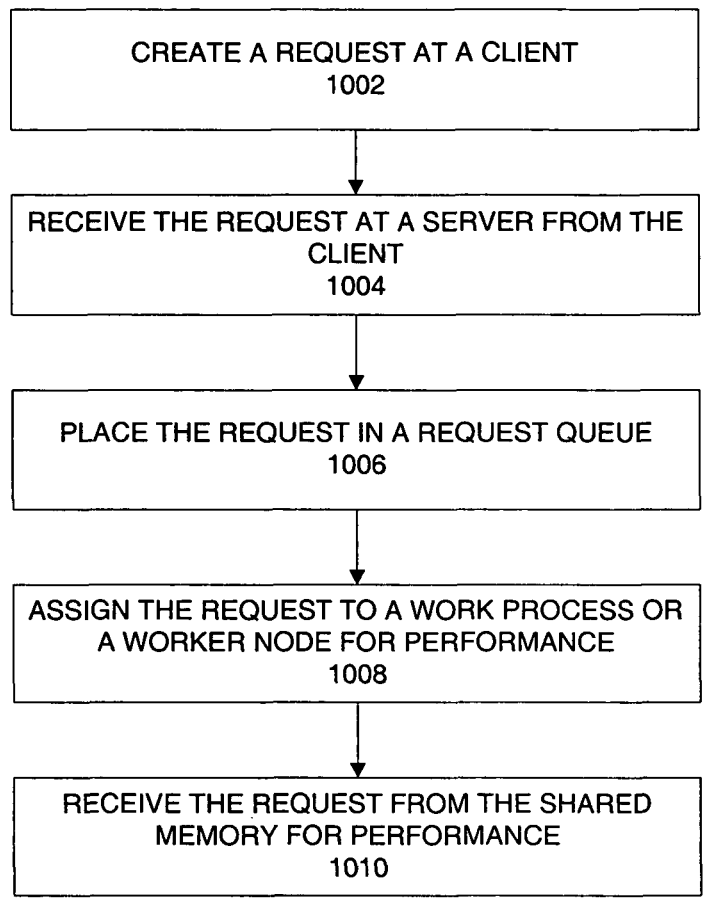
FIG. 10 is a flow diagram illustrating an embodiment of a process for using a Fast Channel Architecture-based shared memory for data processing.

FIG. 10 is a flow diagram illustrating an embodiment of a process for using a Fast Channel Architecture-based shared memory for data processing. At processing block 1002, a request is created at a first FCA client (client). The request is received from a first client at the server at processing block 1004. The request is cached at the FCA-based shared memory and placed in one of the many request queues at the shared memory at processing block 1006.

In one embodiment, the request may be received at the shared memory via the ICM, which may include additional request queues to properly hold, maintain, and distribute the incoming client requests to the shared memory. The request is then assigned to an entity or component, such as an available work process, to process the request at processing block 1008. The assigning of the request for processing includes determining whether the request is ABAP-based or Java-based. For example, an ABAP-based process request is assigned to an available ABAP work process at the ABAP instance, while the Java-based process request is assigned to an available J2EE worker node at the J2EE instance. Having the FCA-based shared memory allows the ABAP and J2EE instances to have direct bi-directional communication via the shared memory.

The assigned request is then retrieved from the shared memory by the available work process or the available worker node so that the request can be satisfied at processing block 1010. The request is then processed at processing block 1012. While the request is being processed by the available work process or worker node, subsequent requests corresponding to various processes are continuously received at the shared memory and are placed in various request queues at the shared memory.

Figure 11:
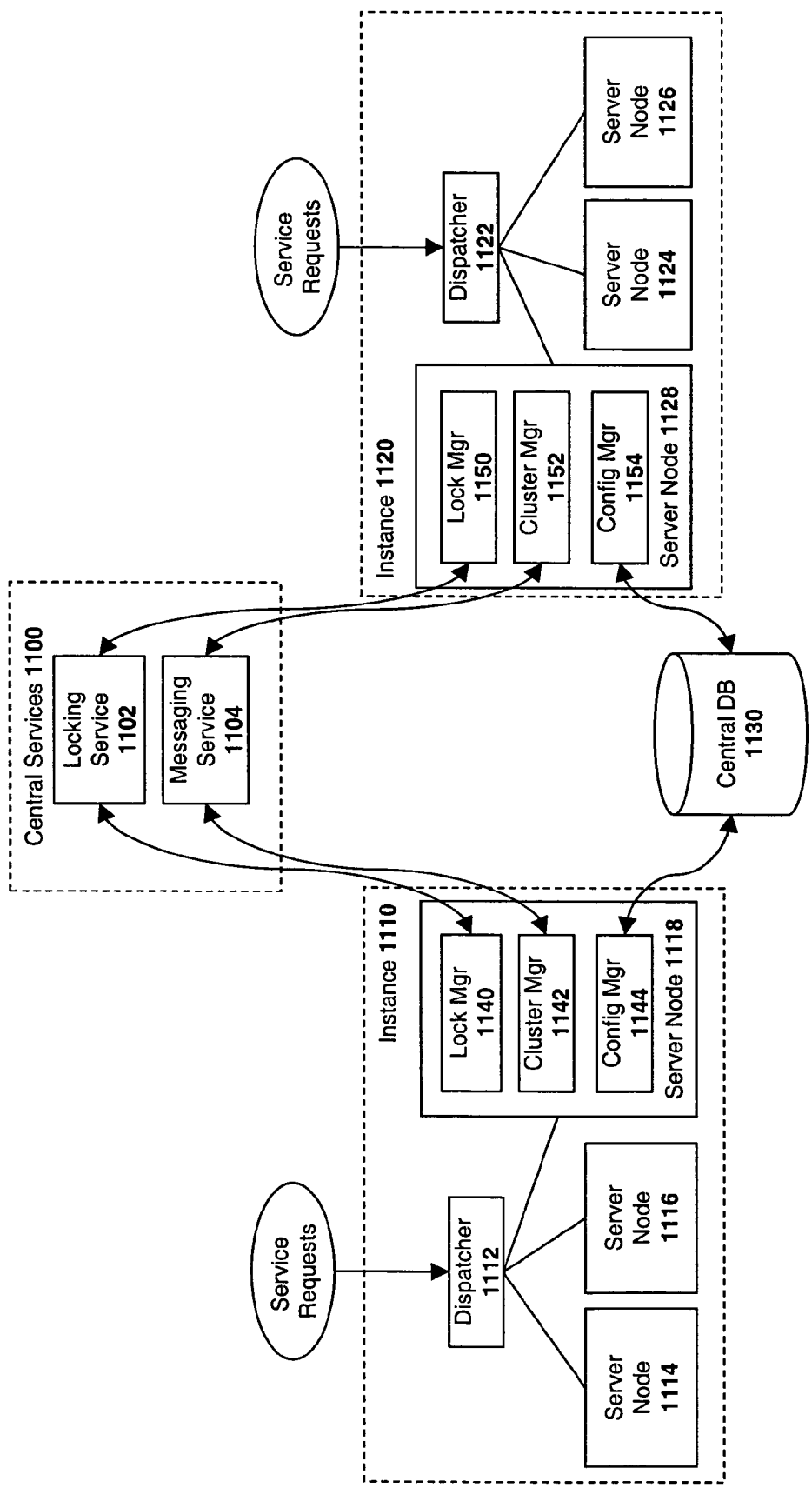
FIG. 11 is a block diagram illustrating an embodiment of a server node system architecture.

A system architecture according to one embodiment of the invention is illustrated in FIG. 11. The architecture includes a central services instance 1100 and a plurality of application server instances 1110, 1120. As used herein, the application server instances, 1110 and 1120, each include a group of sever nodes 1114, 1116, 1118 and 1124, 1126, 1128, respectively, and a dispatcher, 1112, 1122, respectively. The central services instance 1100 includes a locking service 1102 and a messaging service 1104 (described below). The combination of all of the application server instances 1110, 1120 and the central services instance 1100 is referred to herein as a "cluster." Although the following description will focus solely on instance 1110 for the purpose of explanation, the same principles apply to other instances such as instance 1120.

The sever nodes 1114, 1116, 1118 within instance 1110 provide the business and/or presentation logic for the network applications supported by the system. Each of the sever nodes 1114, 1116, 1118 within a particular instance 1110 may be configured with a redundant set of application logic and associated data. In one embodiment, the dispatcher 1110 distributes service requests from clients to one or more of the sever nodes 1114, 1116, 1118 based on the load on each of the servers. For example, in one embodiment, the dispatcher 1110 implements a round-robin policy of distributing service requests.

The sever nodes 1114, 1116, 1118 may be Java 2 Enterprise Edition ("J2EE") sever nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft NET platforms and/or the Advanced Business Application Programming ("ABAP") platforms developed by SAP AG, the assignee of the present application.

In one embodiment, communication and synchronization between each of the instances 1110, 1120 is enabled via the central services instance 1100. As illustrated in FIG. 11, the central services instance 1100 includes a messaging service 1104 and a locking service 1102. The message service 1104 allows each of the servers within each of the instances to communicate with one another via a message passing protocol. For example, messages from one server may be broadcast to all other servers within the cluster via the messaging service 1104 (e.g., such as the cache configuration messages described below). Alternatively, messages may be addressed directly to specific servers within the cluster (i.e., rather than being broadcast to all servers).

In one embodiment, the locking service 1102 disables access to (i.e., locks) certain specified portions of configuration data and/or program code stored within a central database 1130 or resources shared in the cluster by different services. The locking manager locks data on behalf of various system components which need to synchronize access to specific types of data and program code (e.g., such as the configuration managers 1144, 1154). As described in detail below, the locking service enables a distributed caching architecture for caching copies of server/dispatcher configuration data.

In one embodiment, the messaging service 1104 and the locking service 1102 are each implemented on dedicated servers. However, the messaging service 1104 and the locking service 1102 may be implemented on a single server or across multiple servers while still complying with the underlying principles of the invention.

As illustrated in FIG. 11, each sever node (e.g., 1118, 1128) includes a lock manager 1140, 1150 for communicating with the locking service 1102; a cluster manager 1142, 1152 for communicating with the messaging service 1104; and a configuration manager 1144, 1154 for communicating with a central database 1130 (e.g., to store/retrieve configuration data as described herein). Although the lock manager 1140, 1150, cluster manager 1142, 1152 and configuration manager 1144, 1154 are illustrated only with respect to sever nodes 1118 and 1128 in FIG. 11, each of the sever nodes 1114, 1116, 1124 and 1126 and/or on the dispatchers 1112, 1122 may be equipped with equivalent lock managers, cluster managers and configuration managers while still complying with the underlying principles of the invention.

Figure 12:
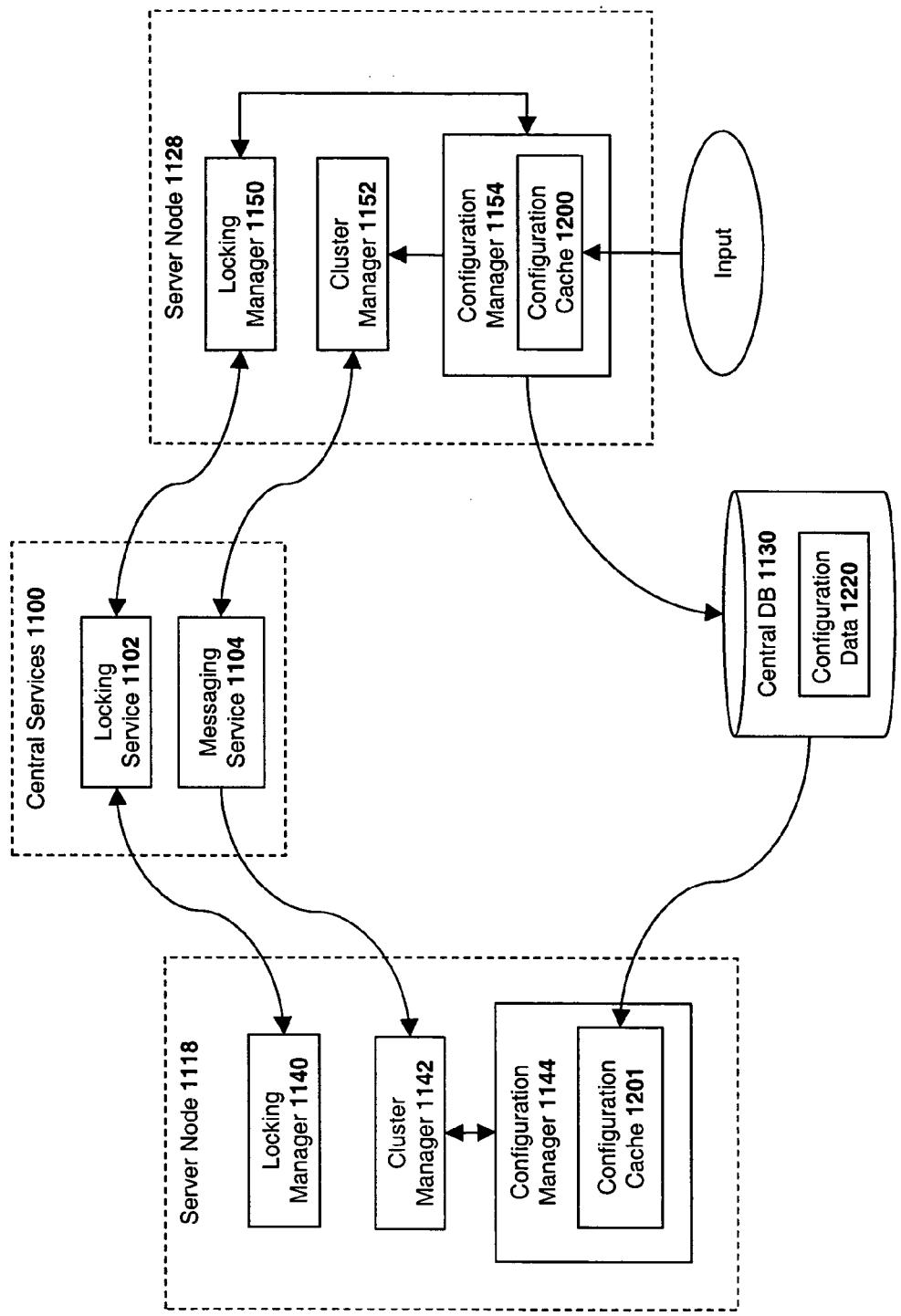
FIG. 12 is a block diagram illustrating an embodiment of a server node architecture which employs a configuration data caching.

Referring now to FIG. 12, in one embodiment, configuration data 1220 defining the configuration of the central services instance 1100 and/or the sever nodes and dispatchers within instances 1110 and 1120, is stored within the central database 1130. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 1144, 1154 cache configuration data locally within configuration caches 1200, 1201. As such, to ensure that the configuration data within the configuration caches 1200, 1201 remains up-to-date, the configuration managers 1144, 1154 implement cache synchronization policies, as described herein.

Figure 13:
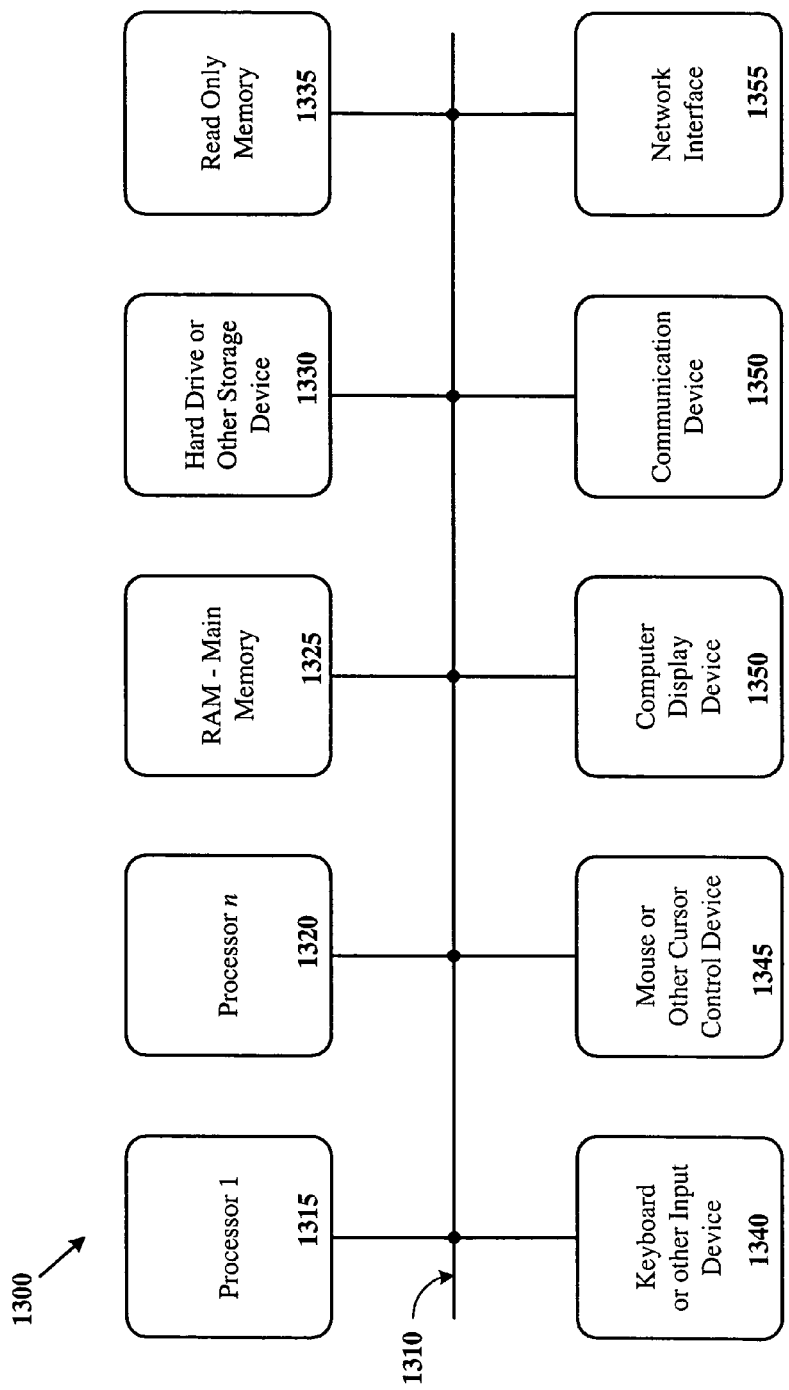
FIG. 13 is an exemplary computer system used in implementing an embodiment of the present invention.

FIG. 13 is an exemplary computer system 1300 used in implementing an embodiment of the present invention. In this illustration, a system 1300 comprises a bus 1310 or other means for communicating data. The system 1300 includes one or more processors, illustrated as shown as processor 1315 through processor n 1320 to process information. The system 1300 further comprises a random access memory (RAM) or other dynamic storage as a main memory 1325 to store information and instructions to be executed by the processor 1315 through 1320. The RAM or other main memory 1325 also may be used for storing temporary variables or other intermediate information during execution of instructions by the processors 1315 through 1320.

A hard drive or other storage device 1330 may be used by the system 1300 for storing information and instructions. The storage device 1330 may include a magnetic disk or optical disc and its corresponding drive, flash memory or other non-volatile memory, or other memory device. Such elements may be combined together or may be separate components. The system 1300 may include a read only memory (ROM) 1335 or other static storage device for storing static information and instructions for the processors 1315 through 1320.

A keyboard or other input device 1340 may be coupled to the bus 1310 for communicating information or command selections to the processors 1315 through 1320. The input device 1340 may include a keyboard, a keypad, a touch-screen and stylus, a voice-activated system, or other input device, or combinations of such devices. The computer may further include a mouse or other cursor control device 1345, which may be a mouse, a trackball, or cursor direction keys to communicate direction information and command selections to the processors and to control cursor movement on a display device. The system 1300 may include a computer display device 1350, such as a cathode ray tube (CRT), liquid crystal display (LCD), or other display technology, to display information to a user. In some environments, the display device may be a touch-screen that is also utilized as at least a part of an input device. In some environments, the computer display device 1350 may be or may include an auditory device, such as a speaker for providing auditory information.

A communication device 1350 may also be coupled to the bus 1310. The communication device 1350 may include a modem, a transceiver, a wireless modem, or other interface device. The system 1300 may be linked to a network or to other device using via an interface 1355, which may include links to the Internet, a local area network, or another environment. The system 1300 may comprise a server that connects to multiple devices. In one embodiment the system 1300 comprises a Java® compatible server that is connected to user devices and to external resources.

While the machine-readable medium 1330 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1300 and that causes the machine to perform any one or more of the methodologies of the present invention. The term "machine-readable medium" shall accordingly be taken to include, but not be limited to, solid-state memories, optical and magnetic media, and carrier wave signals.

Furthermore, it is appreciated that a lesser or more equipped computer system than the example described above may be desirable for certain implementations. Therefore, the configuration of system 1300 may vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), it logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
   initializing a Fast Channel Architecture (FCA) library upon a starting of a specialized process of an operating system by providing a handle to the specialized process of the operating system, the FCA library providing a platform independent Application Program Interface (API) to enable the specialized process of the operating system to use the handle to perform bidirectional communication with an additional specialized process of the operating system via a shared memory connection, the specialized process of the operating system being associated with an application technology, the additional specialized process of the operating system being associated an additional application technology that is distinct from the application technology;

receiving a request from the specialized process of the operating system, the request requesting that the additional specialized process of the operating system perform a transaction, the request configured to be sent to the additional specialized process via one of a shared memory connection and a network connection;

sending the request to the additional specialized process of the operating system via the shared memory connection instead of the network connection based on a determination that the specialized process and the additional specialized process are executing on a same physical host;

receiving a response to the request from the additional specialized process of the operating system; and sending the response to the request to the specialized process of the operating system via the shared memory connection instead of the network connection based on the determination that the specialized process and the additional specialized process are executing on the same physical host, the response including a result of a performing of the transaction by the additional specialized process of the operating system, wherein the receiving of the request, the sending of the request, the receiving of the response, and the sending of the response are performed utilizing the handle provided by the FCA library at an application layer of an application server.

2. The method of claim 1, further comprising facilitating bi-directional communication between a plurality of components via the shared memory, the plurality of components including one or more of the following: an internet communication manager (ICM), an Advanced Business Application Programming (ABAP) engine, and a Java 2 Enterprise Edition (J2EE) engine.

3. The method of claim 2, wherein the facilitating of the bi-directional communication between the plurality of components via the shared memory includes creating a memory pipe at the shared memory upon a starting of a component of the plurality of components.

4. The method of claim 1, further comprising selecting the additional specialized process from a plurality of additional specialized processes based on a checking of a work load of each of the plurality of additional specialized processes.

5. The method of claim 1, wherein the application technology is based on the ABAP standard and the additional application technology is based on the J2EE standard.

6. The method of claim 1, wherein the sending of the request includes sending the request via an internet communication manager (ICM) to the exclusion of sending the request via a dispatcher associated with the application technology, the ICM being a single point of access for assigning the request to one of the specialized process of the operating system and the additional specialized process of the operating system.

7. The method of claim 1, wherein the sending of the request includes placing the request in a request queue at the shared memory.

8. The method of claim 1, wherein the sending of the request to the additional specialized process of the operating system via the shared memory connection is performed via a fast remote function call, the fast remote function call being faster than a typical remote function call, the typical remote function call configured to send the request to the additional specialized process via the network connection.

9. A non-transitory machine-readable medium having stored thereon data representing sets of instructions which, when executed by a machine, cause the machine to:

initialize a Fast Channel Architecture (FCA) library upon a starting of a specialized process of an operating system by providing a handle to the specialized process of the operating system, the FCA library providing a platform independent Application Program Interface (API) to enable the specialized process of the operating system to use the handle to perform bidirectional communication with an additional specialized process of the operating system via a shared memory connection, the specialized process of the operating system being associated with an application technology, the additional specialized process of the operating system being associated an additional application technology that is distinct from the application technology;

receive a request to perform a transaction from the specialized process of the operating system, the request requesting that the additional specialized process of the operating system perform a transaction, the request configured to be sent to the additional specialized process via one of a shared memory connection and a network connection;

sending the request to the additional specialized process of the operating system via the shared memory connection instead of the network connection based on a determination that the specialized process and the additional specialized process are executing on a same physical host;

receiving a response to the request from the additional specialized process of the operating system; and sending the response to the request to the specialized process of the operating system via the shared memory connection instead of the network connection based on the determination that the specialized process and the additional specialized process are executing on the same physical host via the shared memory, the response including a result of a performing of the transaction by the additional specialized process of the operating system, wherein the receiving of the request, the sending of the request, the receiving of the response, and the sending of the response are performed utilizing the handle provided by the FCA library at an application layer of an application server.

10. The non-transitory machine-readable medium of claim 9, further comprising facilitating bi-directional communication between a plurality of components via the shared memory, the plurality of components including one or more of the following: an interne communication manager (ICM), an Advanced Business Application Programming (ABAP) engine, and a Java 2 Enterprise Edition (J2EE) engine.

11. The non-transitory machine readable medium of claim 9, wherein the sending of the request to perform the transaction to the additional specialized process via the shared memory eliminates a need to copy the request into a local memory of the additional specialized process.

12. The non-transitory machine readable medium of claim 9, wherein the sending of the request includes using the platform-independent application program interface at an internet communication manager (ICM) to receive the handle.

13. The non-transitory machine readable medium of claim 12, wherein the receiving of the handle represents an opening of a connection to a request queue in the shared memory.

14. A system comprising:
- at least one processor;
- an application server implemented by the at least one processor and configured to:
- initialize a Fast Channel Architecture (FCA) library upon a starting of a specialized process of an operating system by providing a handle to the specialized process of the operating system, the FCA library providing a platform independent Application Program Interface (API) to enable the specialized process of the operating system to use the handle to perform bidirectional communication with an additional specialized process of the operating system via a shared memory connection, the specialized process of the operating system being associated with an application technology, the additional specialized process of the operating system being associated an additional application technology that is distinct from the application technology;
- receive a request from the specialized process of the operating system, the request requesting that the additional specialized process of the operating system perform a transaction, the request configured to be sent to the additional specialized process via one of a shared memory connection and a network connection;
- send the request to the additional specialized process of the operating system via the shared memory connection instead of the network connection based on a determination that the specialized process and the additional specialized process are executing on a same physical host;
- receive a response to the request from the additional specialized process;
- send the response to the request to the specialized process via the shared memory connection instead of the network connection based on the determination that the specialized process and the additional specialized process are executing on the same physical host, the response including a result of a performing of the transaction by the additional specialized process of the operating system, wherein the receiving of the request, the sending of the request, the receiving of the response, and the sending of the response are performed utilizing the handle provided by the FCA library at an application layer of the application server.

* * * * *